US012112569B2

(12) United States Patent
Mahbub et al.

(10) Patent No.: US 12,112,569 B2
(45) Date of Patent: *Oct. 8, 2024

(54) MULTI-STAGE NEURAL NETWORK PROCESS FOR KEYPOINT DETECTION IN AN IMAGE

(71) Applicant: QUALCOMM Incorporated, San Diego, CA (US)

(72) Inventors: Upal Mahbub, Santee, CA (US); Rakesh Nattoji Rajaram, San Diego, CA (US); Vasudev Bhaskaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/455,883

(22) Filed: Nov. 19, 2021

(65) Prior Publication Data

US 2022/0076059 A1 Mar. 10, 2022

Related U.S. Application Data

(63) Continuation-in-part of application No. 16/700,219, filed on Dec. 2, 2019, now Pat. No. 11,256,956.

(51) Int. Cl.
*G06V 40/16* (2022.01)
*G06N 3/045* (2023.01)
*G06T 5/92* (2024.01)
*G06T 7/11* (2017.01)
*G06V 40/10* (2022.01)

(52) U.S. Cl.
CPC ........... *G06V 40/171* (2022.01); *G06N 3/045* (2023.01); *G06T 5/92* (2024.01); *G06T 7/11* (2017.01); *G06V 40/103* (2022.01)

(58) Field of Classification Search
CPC ...... G06F 18/213; G06N 3/045; G06N 3/084; G06T 5/92; G06T 7/11; G06T 2207/20081; G06T 2207/20084; G06T 2207/30201; G06V 40/103; G06V 40/171; G06V 10/25; G06V 10/764; G06V 10/82
USPC ........................................................ 382/158
See application file for complete search history.

(56) References Cited

U.S. PATENT DOCUMENTS

2011/0299782 A1    12/2011   Hamsici et al.
2018/0315154 A1*  11/2018   Park ................... G06F 18/2413
2018/0315155 A1*  11/2018   Park ................... G06V 10/454
(Continued)

OTHER PUBLICATIONS

International Search Report and Written Opinion—PCT/US2022/050487—ISA/EPO—Apr. 4, 2023 11 pages.

*Primary Examiner* — Juan A Torres
(74) *Attorney, Agent, or Firm* — QUALCOMM Incorporated

(57) ABSTRACT

Embodiments include systems and methods that may be performed by a processor of a computing device. Embodiments may be applied for keypoint detection in an image. In embodiments, the processor of the computing device may apply to an image a first-stage neural network to define and output a plurality of regions, apply to each of the plurality of regions a respective second-stage neural network to output a plurality of keypoints in each of the plurality of regions, and apply to the plurality of keypoints a third-stage neural network to determine a correction for each of the plurality of keypoints to provide corrected keypoints.

30 Claims, 10 Drawing Sheets

(56) References Cited

U.S. PATENT DOCUMENTS

| | | | |
|---|---|---|---|
| 2019/0156145 A1* | 5/2019 | Pourian | G06F 18/22 |
| 2019/0172223 A1 | 6/2019 | Vajda et al. | |
| 2019/0278983 A1 | 9/2019 | Iqbal et al. | |
| 2020/0272888 A1* | 8/2020 | Wang | G06V 40/103 |
| 2021/0110180 A1 | 4/2021 | Wang et al. | |
| 2021/0166070 A1 | 6/2021 | Mahbub | |

* cited by examiner

MULTI-STAGE NEURAL NETWORK PROCESS FOR KEYPOINT DETECTION IN AN IMAGE

RELATED APPLICATIONS

This application is a continuation-in-part application of and claims the benefit of priority to U.S. Non-Provisional patent application Ser. No. 16/700,219 entitled "Multi-Stage Neural Network Process for Keypoint Detection In An Image" filed on Dec. 2, 2019, the entire contents of which are hereby incorporated by reference for all purposes.

BACKGROUND

Face keypoint detection (e.g., landmarks) is a process used in a wide variety of practical applications, such as face recognition, face-based authentication, face bokeh, animoji, face beautification, and face swapping. In conventional approaches, face keypoints are regressed directly from the images or obtained from heatmaps generated by a system or network trained using machine learning or deep learning approaches. However, such systems are computationally intensive, and the complexity of information increases computational requirements geometrically. As the number of facial keypoint that such systems must process increases, such systems are increasingly resource hungry, impractical for mobile computing device applications, and are not useful for on-chip implementations for real-time operation.

SUMMARY

Various aspects include systems and methods using a multi-stage neural network process that may be performed by a processor of a computing device. Various aspects may apply the systems and methods for keypoint detection in an image. Various aspects may include analyzing an image using a first-stage neural network to define and output a plurality of regions, analyzing each of the plurality of regions using a respective second-stage neural network to output a plurality of keypoints in each of the plurality of regions, and analyzing the plurality of keypoints using a third-stage neural network to determine a correction for each of the plurality of keypoints to provide corrected keypoints. In some aspects, the corrected keypoints may be suitable for execution of an image processing function.

Various embodiments include methods performed by a processor of a computing device for keypoint detection in an image, that may include analyzing an image using a first-stage neural network to define and output a plurality of regions; analyzing each of the plurality of regions using a respective second-stage neural network to output a plurality of keypoints in each of the plurality of regions; and analyzing the plurality of keypoints using a third-stage neural network to determine a correction for each of the plurality of keypoints to provide corrected keypoints. Some embodiments may further include executing the image processing function based on the corrected keypoints.

In some embodiments, analyzing an image using a first-stage neural network to define a plurality of regions may include analyzing the image using the first-stage neural network to determine one or more anchor points each comprising a center point for each of the plurality of regions. In some embodiments, analyzing an image using a first-stage neural network to define a plurality of regions may include analyzing the image using the first-stage neural network to determine a multi-dimensional global feature for the image. In some embodiments, analyzing an image using a first-stage neural network to define a plurality of regions may include analyzing the image using the first-stage neural network to derive a bounding box for each of the plurality of regions. In some embodiments, analyzing an image using a first-stage neural network that has been trained to define and output a plurality of regions may include applying the first-stage neural network to define for each of the plurality of regions a smallest bounding box that includes keypoints to be determined from each region.

Some embodiments may further include identifying in the image an image of a portion of a human body; and segmenting the image of the portion of the human body into the plurality of regions.

In some embodiments, analyzing each of the plurality of regions using a respective second-stage neural network to output a plurality of keypoints in each of the plurality of regions may include applying the second-stage neural network to the image to determine a multi-dimensional local feature for each of the plurality of regions. In some embodiments, analyzing the plurality of keypoints using a third-stage neural network to determine a correction for each of the plurality of keypoints to provide corrected keypoints suitable for the execution of an image processing function may include applying the third-stage neural network to the plurality of keypoints and to one or more of a multi-dimensional global feature for the image and a multi-dimensional local feature for each of the plurality of regions to determine the correction for each of the plurality of keypoints.

In some embodiments, each second-stage neural network may be been trained to output keypoints for its respective region. In some embodiments, analyzing each of the plurality of regions using a respective second-stage neural network that has been trained to output a plurality of keypoints in each of the plurality of regions may be performed in parallel.

Further aspects may include a computing device including a memory and a processor coupled to the memory and configured with processor-executable instructions to perform operations of any of the methods described above. Further aspects may include processor-readable storage media upon which are stored processor executable instructions configured to cause a controller of a computing device to perform operations of any of the methods described above. Further aspects may include a computing device including means for performing functions of any of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of some embodiments.

DETAILED DESCRIPTION

Figure 1:
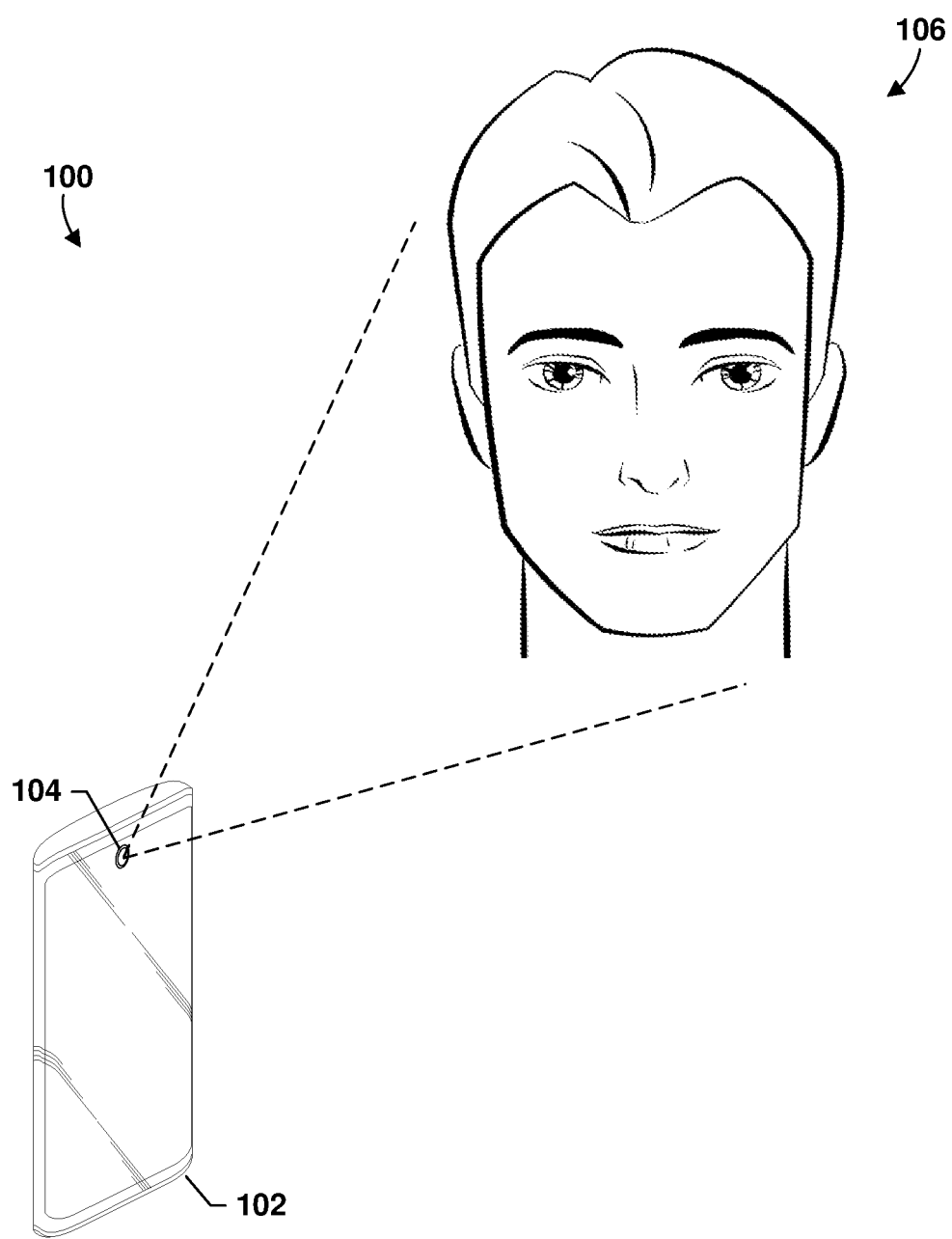
FIG. 1 is a system block diagram illustrating an example system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments provide methods for identifying keypoints in images, such as images of faces or other body parts, that are suitable for implementation in resource limited devices, such as mobile computing devices. Various embodiments include using a first-stage neural network process to segment an image into a plurality of image segments, using a second-stage neural network process to identify a keypoint in each image segment, and using a third-stage neural network process to correct for errors or distortions in keypoint locations resulting from the second-stage neural network process. Segmenting an image and applying neural networks trained for each segment to identify one or a few keypoints in each segment enables the use of neural network processes that can be performed on resource limited computing devices, while applying the third-stage neural network process to the output of the second-stage neural network process provides corrections for distortions or errors introduce by processing an image in segments.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "computing device" is used herein to refer to any one or all of cellular telephones, smartphones, portable computing devices, personal or mobile multi-media players, laptop computers, tablet computers, smartbooks, ultrabooks, palmtop computers, electronic mail receivers, multimedia Internet-enabled cellular telephones, router devices, medical devices and equipment, biometric sensors/devices, wearable devices including smart watches, smart clothing, smart glasses, smart wrist bands, smart jewelry (e.g., smart rings, smart bracelets, etc.), entertainment devices (e.g., gaming controllers, music and video players, satellite radios, etc.), Internet of Things (IoT) devices including smart meters/sensors, industrial manufacturing equipment, large and small machinery and appliances for home or enterprise use, computing devices within autonomous and semiautonomous vehicles, mobile devices affixed to or incorporated into various mobile platforms, global positioning system devices, and similar electronic devices that include a memory and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

Keypoint detection in an image, such as detecting facial landmarks, is an enabling process for practical applications such as facial recognition, face-based authentication, photo/image processing, and a variety of other consumer applications. Conventional approaches involve regressing key points directly from an image obtained from heatmaps generated by a system or network trained using machine learning or deep learning approaches. However, the complexity of these computational systems increases non-linearly, and as requirements for accuracy and data processing increase, such systems are increasingly not viable for on-chip implementations for real-time operations. For example, conventional approaches may use a single convolutional neural network to generate a large number of landmarks for an image, which requires a large neural network to handle such complexity. Such a network is highly resource intensive, and thus not suitable for implementation in resource limited computing devices, such as smartphone and tablet computers. Further such methods may not be further scalable.

Various embodiments include systems and methods of keypoint detection in an image that is suitable for execution on resource limited computing devices and may be more scalable than conventional approaches. Implementations may be applied to a variety of practical applications, such as face recognition, hand joint detection, human body joint detection, photo enhancement, image processing, and other various applications.

In various embodiments, a processor of a computing device may apply a first-stage neural network to an image data file to define a plurality of regions. In some embodiments, the first-stage neural network that is applied to an image data file may be a neural network that has been trained to identify in image data a portion of a human body (e.g., a face, a joint, a limb, etc.) and to segment the portion of the human body into a plurality of image segments or regions. For example, the first-stage neural network may be trained with a suitable training data set to segment an image of a face into multiple regions or image segments that will contain a suitable keypoint, such as regions containing the eyes, a region containing the nose, regions containing cheekbones, one or more regions containing the lips, etc. In some embodiments, the first-stage neural network may be trained to determine one or more anchor points for each of the plurality of regions, and to define for each of the plurality of anchor points a smallest bounding box within the image that includes keypoints to be determined from each region. The bounding boxes may define image segments that will be processed separately in a second-stage neural network process. In some embodiments, the processor may apply the first-stage neural network to the image to determine a multi-dimensional global feature for the image.

In some embodiments, the processor of the computing device may apply to each of the plurality of image segments a second-stage neural network to obtain a plurality of keypoints in each of the plurality image segments. In some embodiments, the second-stage neural network applied to each region may be specifically trained for that region or image segments. For example, after the first-stage neural network processes has segmented an image of a face into multiple regions or image segments (e.g., an eyebrow region, an eye region, a nose region, etc.), the processor may apply to each segment a second-stage neural network that is trained to locate a key point in a respective region of a face, such as a second-stage neural network trained to find keypoints within eyebrow regions of a face image, a second-stage neural network trained to find keypoints within eye regions of a face image, a second-stage neural network that is trained to find keypoints within nose regions of a face image, and so forth. In some embodiments, each of the second-stage neural networks may identify a plurality of keypoints in each of the plurality of regions. In some embodiments, each of the second-stage neural networks may also obtain local features for each of the plurality of regions. By applying second-stage neural networks that are trained for specific regions of an image (e.g., trained for specific regions on a human face) to image segments encompassing such regions, the neural network processes may be of a size and complexity that they can be applied by a resource limited computing device. The application of a plurality of the second-stage neural networks to a plurality of image segments may be performed in series, in parallel or partially in series and partially in parallel, depending on the resources available (e.g., processing capacity and working memory).

In various embodiments, the processor of the computing device may apply to the plurality of keypoints a third-stage neural network that has been trained to determine corrections for each of the plurality of keypoints output by the second-stage neural network process. Segmenting an image into regions and separately identifying keypoints within each region or segment may introduce distortions or errors in the locations of keypoints compared to the locations of keypoints that would be obtained by a whole-image (e.g., whole face) process. To address this potential, the processor may apply the third-stage neural network to the keypoints to determine a position correction for each of the plurality of keypoints, thereby generating a corrected set of keypoints that are suitable for the execution of an image processing function. In some embodiments, the third-stage neural network may use a multi-dimensional global feature for the image (e.g., the multi-dimensional global feature for the image determined by the first-stage neural network) to determine appropriate location corrections for each of the plurality of keypoints. Additionally or alternatively, in some embodiments, the third-stage neural network may use a multi-dimensional local feature for each of the plurality of regions (e.g., the multi-dimensional local feature determined by each second-stage neural network for each respective region) to determine the correction for each of the plurality of keypoints.

In various embodiments, the processor may use the corrected keypoints to execute an image processing function. Such image processing function may include, for example, facial recognition, face-based authentication, hand joint detection, body joint detection, photo enhancement, photo filters (e.g., adding a hat, mustache, etc. to an image of a face), or another suitable image processing function.

Various embodiments improve the operation of computing devices configured to implement keypoint detection systems by decreasing the computational intensity required to detect keypoints in an image, thereby increasing the efficiency and speed of such systems, and enabling the keypoint location process to be accomplished on resource limited devices. Various embodiments improve the operation of computing devices configured to implement keypoint detection systems by increasing the scalability of such systems. Various embodiments enable the rapid and efficient processing of increased amounts of information and the detection of a greater number of landmarks in an image, thereby increasing the accuracy and usefulness of such systems.

FIG. 1 illustrates an example system 100 suitable for implementing any of the various embodiments. The system 100 may include a computing device 102 configured to implement a keypoint detection system. The computing device 102 may include one or more image sensors such as a camera 104. The camera 104 may be directed to capture an image, for example, of a body or portion of the body, such as a face 106. The system 100 may be implemented in a wide variety of embodiments, and it will be appreciated that the illustration of the computing device 102 as a smart phone in FIG. 1 is not a limitation on possible implementations.

Similarly, the system 100 may be applied to a variety of images and is not limited to images of a face.

Figure 2:
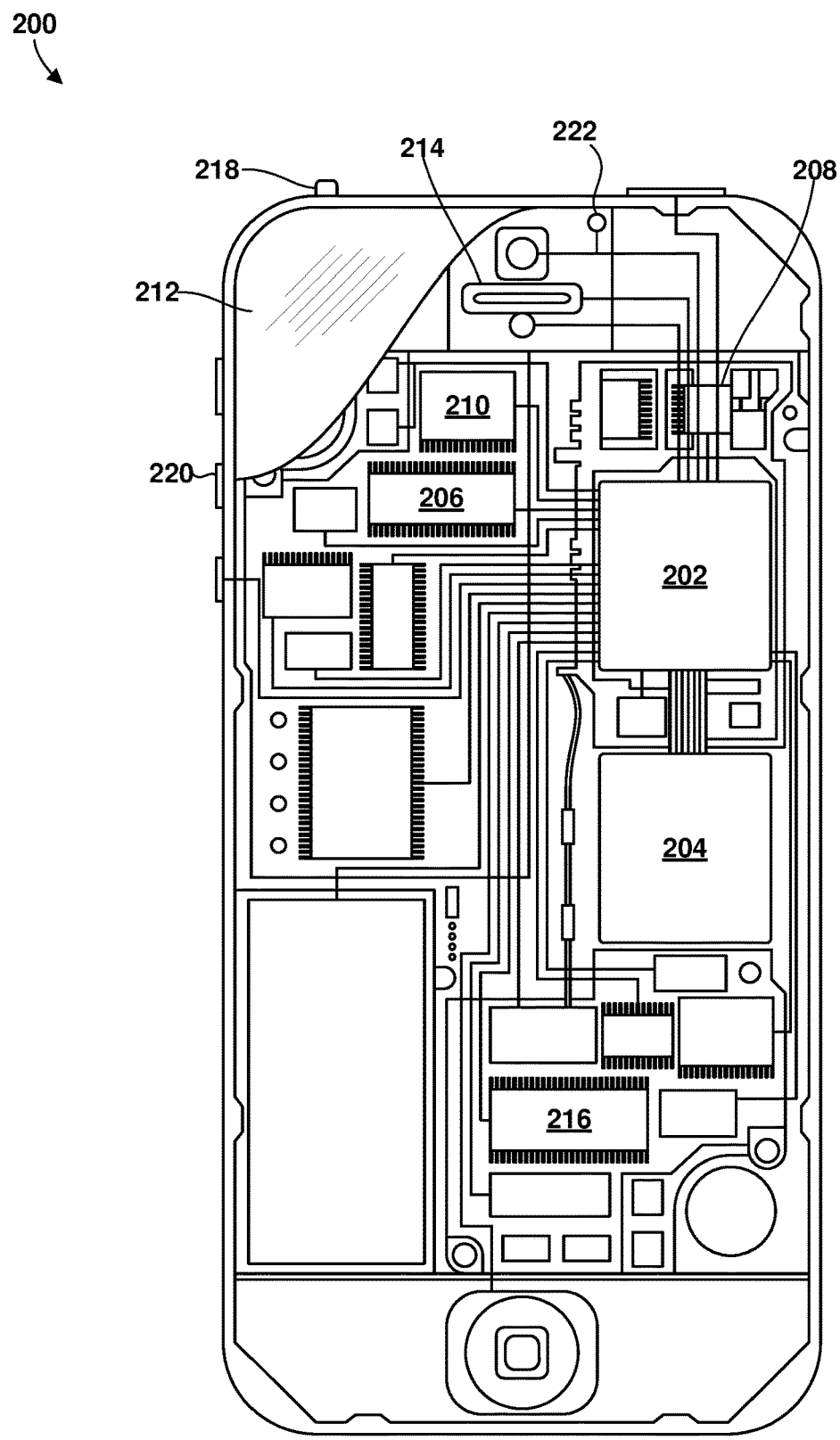
FIG. 2 is a component block diagram illustrating a computing device suitable for implementing any of the various embodiments.

FIG. 2 is a component block diagram of an example computing device 200 suitable for implementing any of the various embodiments. With reference to FIGS. 1 and 2, the computing device 200 may include a first System-On-Chip (SOC) processor 202 (such as a SOC-CPU) coupled to a second SOC 204 (such as a 5G capable SOC). The first and second SOCs 202, 204 may be coupled to internal memory 206, 216, a display 212, and to a speaker 214. Additionally, the computing device 200 may include an antenna 218 for sending and receiving electromagnetic radiation that may be connected to a wireless data link and/or wireless transceiver 208 coupled to one or more processors in the first and/or second SOCs 202, 204. The one or more processors may be configured to determine signal strength levels of signals received by the antenna 218. The computing device 200 may also include menu selection buttons or rocker switches 220 for receiving user inputs. In addition, soft virtual buttons may be presented on display 212 for receiving user inputs.

The computing device 200 may also include a sound encoding/decoding (CODEC) circuit 210, which digitizes sound received from a microphone (not illustrated) into data packets suitable for wireless transmission and decodes received sound data packets to generate analog signals that are provided to the speaker to generate sound. Also, one or more of the processors in the first and second SOCs 202, 204, wireless transceiver 208 and CODEC 210 may include a digital signal processor (DSP) circuit (not shown separately). The computing device 200 may also include one or more optical sensors 222, such as a camera. The optical sensors 222 may be coupled to one or more processors in the first and/or second SOCs 202, 204 to control operation of and to receive information from the optical sensor(s) 222 (e.g., images, video, and the like).

The processors (e.g., SOCs 202, 204) of the computing device 200 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications including processor-executable instructions may be stored in non-transitory processor-readable storage media, such as the memory 206, 216, before the processor-executable instructions are accessed and loaded into the processor. The processors 202, 204 may include internal memory sufficient to store the application software instructions.

Figure 3:
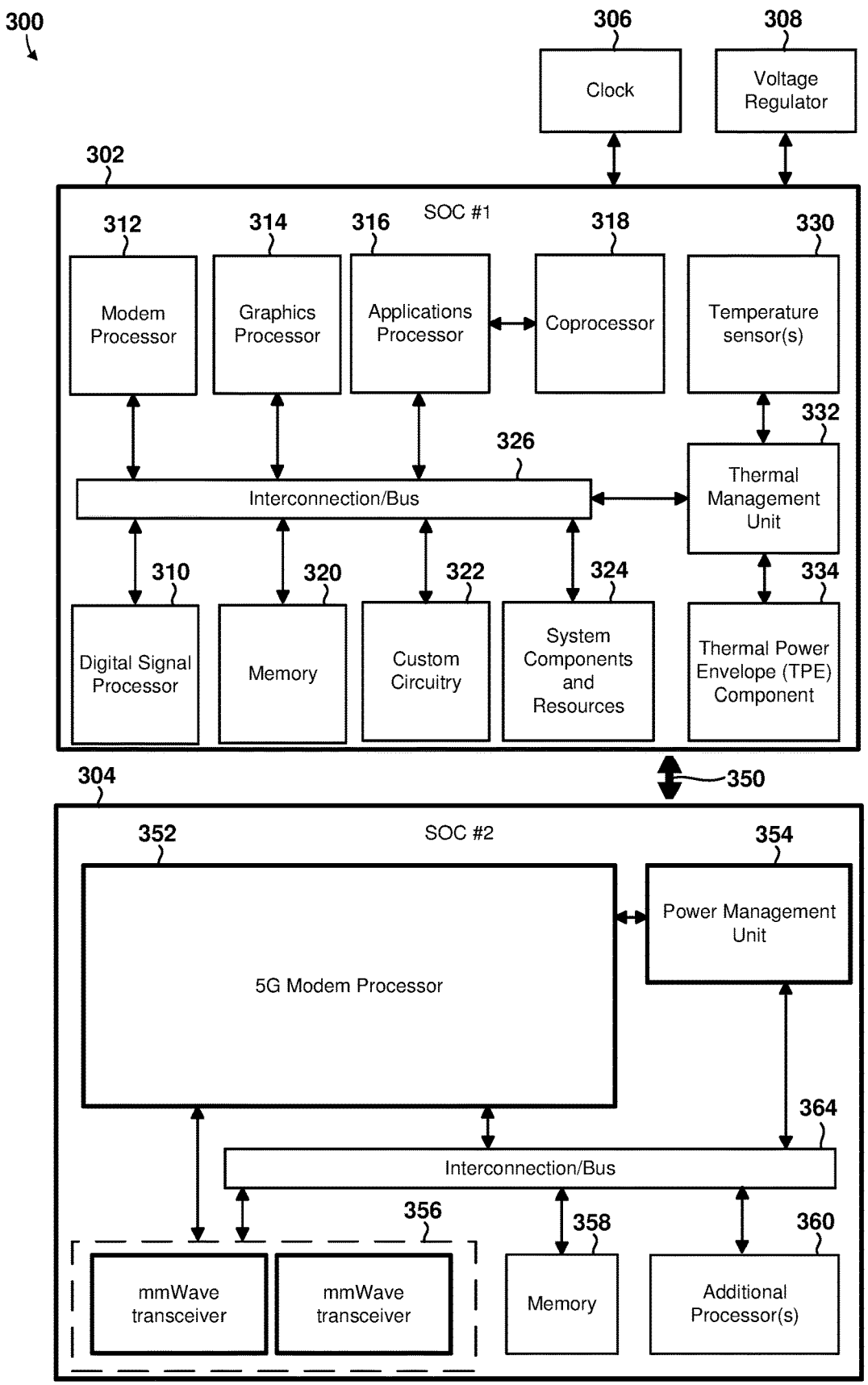
FIG. 3 is a component block diagram illustrating components of a computing device suitable for implementing any of the various embodiments.

FIG. 3 is a component block diagram illustrating components 300 of a computing device (e.g., 102, 200) suitable for implementing any of the various embodiments. Various embodiments may be implemented on a number of single processor and multiprocessor computer systems, including a system-on-chip (SOC) or system in a package (SIP). With reference to FIGS. 1-3, the illustrated example components 300 include a two SOCs 302, 304, a clock 306, and a voltage regulator 308. In some embodiments, the first SOC 302 operate as central processing unit (CPU) of the wireless device that carries out the instructions of software application programs by performing the arithmetic, logical, control and input/output (I/O) operations specified by the instructions. In some embodiments, the second SOC 304 may operate as a specialized processing unit. For example, the second SOC 304 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 302 may include a digital signal processor (DSP) 310, a modem processor 312, a graphics processor 314, an application processor 316, one or more coprocessors 318 (e.g., vector co-processor) connected to one or more of the processors, memory 320, custom circuitry 322, system components and resources 324, an interconnection/bus module 326, one or more temperature sensors 330, a thermal management unit 332, and a thermal power envelope (TPE) component 334. The second SOC 304 may include a 5G modem processor 352, a power management unit 354, an interconnection/bus module 364, a plurality of mmWave transceivers 356, memory 358, and various additional processors 360, such as an applications processor, packet processor, etc.

Each processor 310, 312, 314, 316, 318, 352, 360 may include one or more cores, and each processor/core may perform operations independent of the other processors/cores. For example, the first SOC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360 may be included as part of a processor cluster architecture (e.g., a synchronous processor cluster architecture, an asynchronous or heterogeneous processor cluster architecture, etc.).

The first and second SOC 302, 304 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 324 of the first SOC 302 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, electronic displays, wireless communication devices, external memory chips, etc.

The first and second SOC 302, 304 may communicate via interconnection/bus module 350. The various processors 310, 312, 314, 316, 318, may be interconnected to one or more memory elements 320, system components and resources 324, and custom circuitry 322, and a thermal management unit 332 via an interconnection/bus module 326. Similarly, the processor 352 may be interconnected to the power management unit 354, the mmWave transceivers 356, memory 358, and various additional processors 360 via the interconnection/bus module 364. The interconnection/bus module 326, 350, 364 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 302, 304 may further include an input/output module (not illustrated) for communicating with resources external to the SOC, such as a clock 306 and a voltage regulator 308. Resources external to the SOC (e.g., clock 306, voltage regulator 308) may be shared by two or more of the internal SOC processors/cores.

In addition to the example implementation of the components 300 discussed above, various embodiments may be implemented in a wide variety of computing systems, which may include a single processor, multiple processors, multi-core processors, or any combination thereof.

Figure 4A:
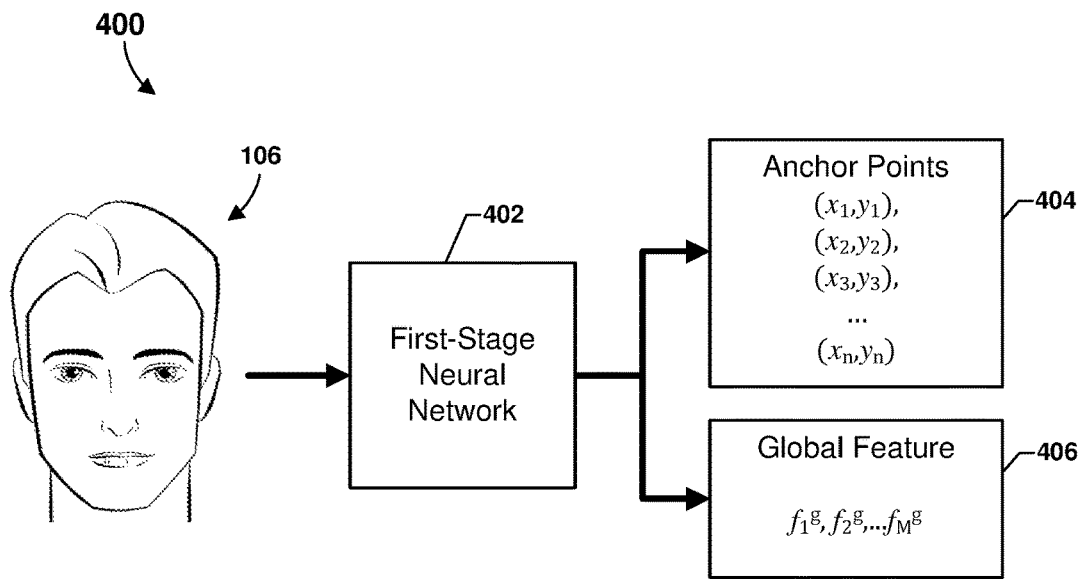
FIGS. 4A and 4B are conceptual diagrams illustrating aspects of a method for keypoint detection in accordance with various embodiments.
Figure 4B:
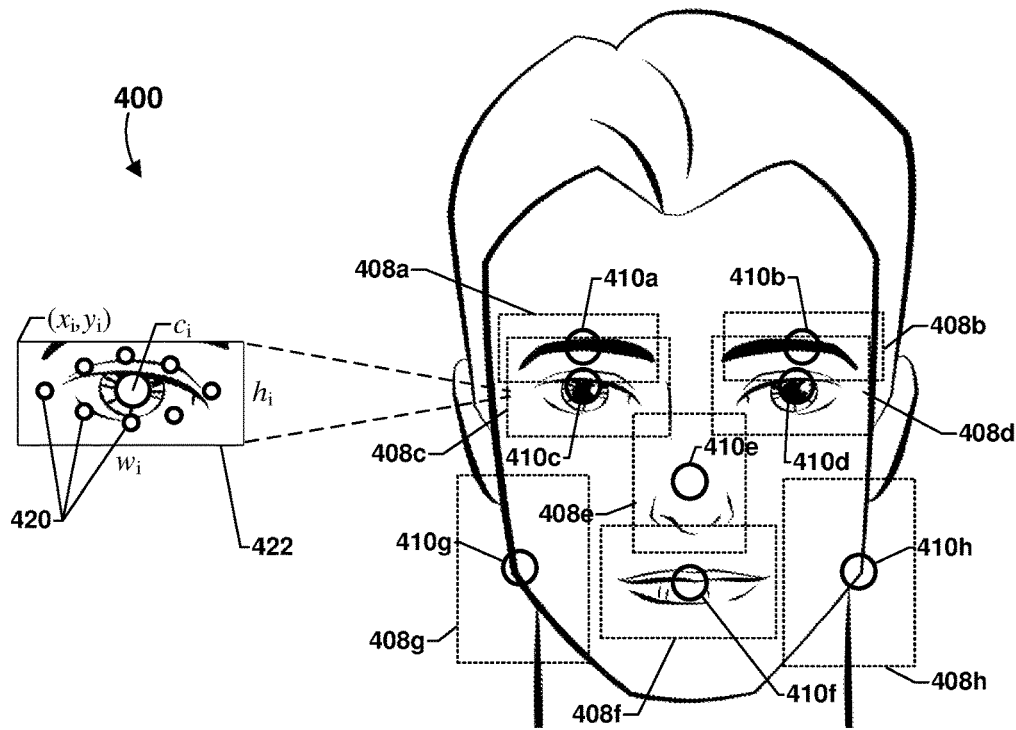

FIGS. 4A and 4B are conceptual diagrams illustrating aspects of a method 400 for keypoint detection in accordance with various embodiments. With reference to FIGS. 1-4B, in various embodiments, a processor (e.g., 202, 204, 310, 312, 314, 316, 318, 352, 360) of a computing device (e.g., 102, 200) may apply a first-stage neural network 402 to an image (e.g., 106) to define a plurality of regions. For conciseness, the terms "image" and "image file" are used herein to refer to any representation or form of an image on which operations may be performed by a neural network, for example, such as an image file, a digital representation of an image in volatile memory, and the like.

In some embodiments, the first-stage neural network 402 may identify within the image a portion that includes in particular a human body part (e.g., a face, a joint, a limb, etc.). In some embodiments, the first-stage neural network 402 may identify or detect one or more regions within body part, such as regions of a face (e.g., regions 408a-408h). The first-stage neural network 402 may be generated by training a neural network on an image data set that includes a body part of interest (e.g., faces) and that provides examples of appropriate segmentations of the body part into regions (e.g., 408a-408h) that will contain keypoints. Applying a first-stage neural network 402 that has been trained in this manner to an image will thus result in an output that identifies regions within the image likely to contain keypoints consistent with the training data set. In some embodiments, the first-stage neural network 402 may provide as output one or more bounding boxes of detected region(s), as further described below.

Referring to FIG. 4A, in some embodiments, the first-stage neural network 402 may output one or more anchor points 404 that may serve as a center point for each region. Such anchor points may be represented as $(x_n, y_n)$ of a region n. In some embodiments, the first-stage neural network may output a bounding box based on a determined anchor point 404 and a predetermined height value and width value. In some embodiments, the first-stage neural network 402 may output an anchor point and may also determine (or calculate) a height value and width value for each bounding box. In some embodiments, the first-stage neural network 402 also may output a global feature 406 based on the image or image region as a whole (i.e., the image or region including all of the bounding boxes, rather than one or a subset of the bounding boxes). In some embodiments, the first-stage neural network 402 may be trained to determine a multi-dimensional global feature 406 for the image. In some embodiments, the global feature 406 may include M dimensions or features of the image. In some embodiments, the global feature 406 may be expressed as $f_1^g, f_2^g, \ldots f_M^g$ in which f represents a value of a feature, M represents a dimension or feature, and g indicates that the feature is a global feature. In some embodiments, the first-stage neural network 402 also may output a loss value (not shown).

Referring to FIG. 4B, in some embodiments, the first-stage neural network 402 may output estimated keypoints (e.g., 420) within each region (e.g., 408a-408h) and may derive a bounding box based on the estimated keypoints. In some embodiments, deriving a bounding box based on the estimated keypoints may include determining a center point, a height value, and a width value for each bounding box. In such embodiments, a training set of data for the first-stage neural network 402 may include annotations of landmarks (e.g., body features, facial features, etc.). In some embodiments, keypoints may be normalized, e.g., by face size, to promote consistent measurements across different sampled images (e.g., of different faces). In some embodiments, a number of regions may be predetermined. In some embodiments, the first-stage neural network 402 may determine keypoints for each region, and may determine a smallest bounding box that encapsulates the determined keypoints. In some embodiments, the first-stage neural network 402 may be trained to perform a regression to determine the smallest bounding box (e.g., 422) that includes keypoints (e.g., 420) to be determined for each region. In some embodiments, the first-stage neural network 402 may be trained to estimate a center c, (e.g., centers 410a-410h), a width w, and a height h for each bounding box (which may be referred to as a bounding box i). In some embodiments, the center may be expressed as $$c_i = x_i + \frac{w_i}{2}, y_i + \frac{h_i}{2}$$

for each bounding box i. In some embodiments, the first-stage neural network 402 may be trained to estimate the center ci, and then to estimate a width w, and a height h for each bounding box i such that a majority of keypoints (e.g., 95% of the keypoints) are included in the bounding box.

Figure 5A:
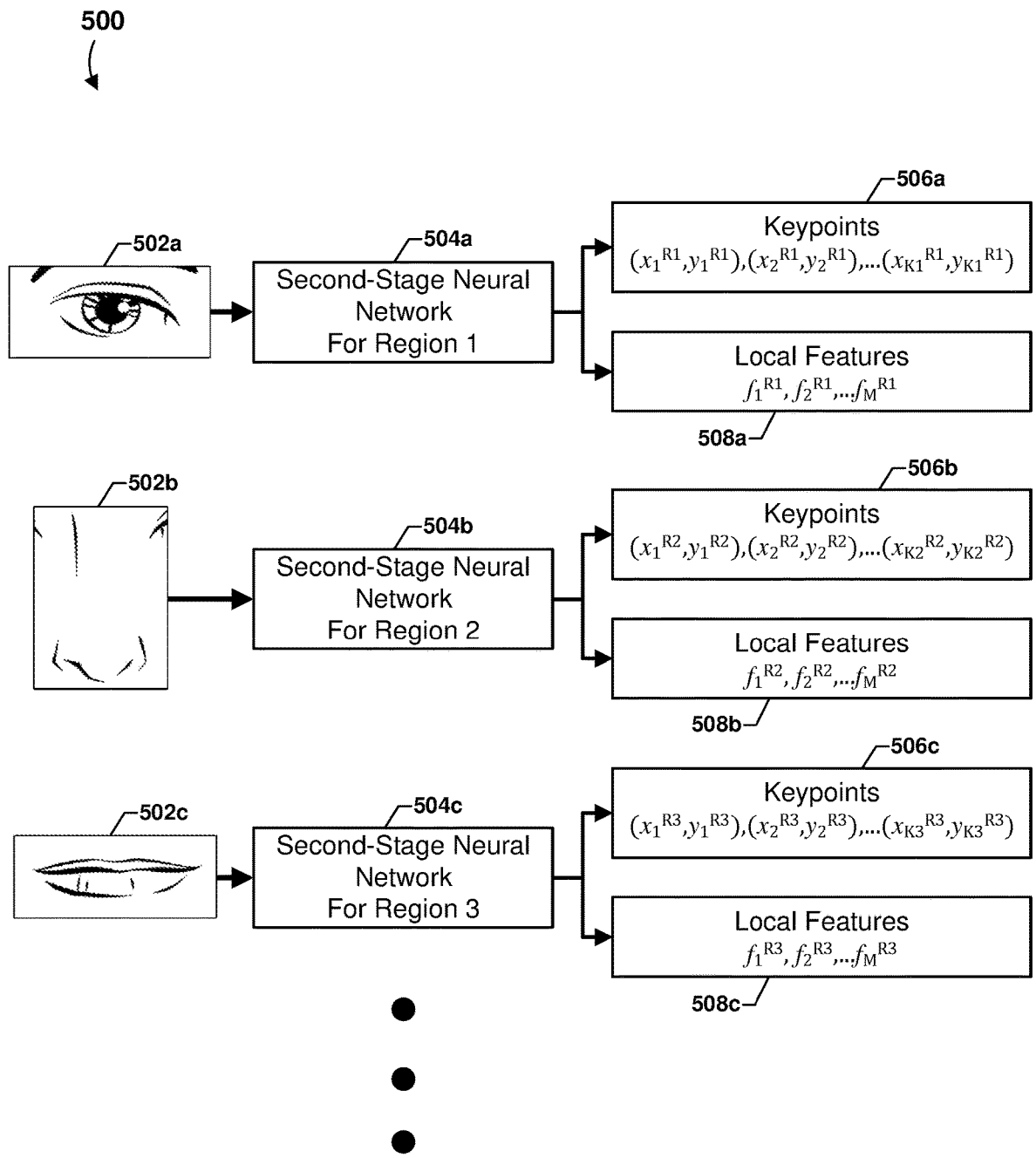
FIGS. 5A and 5B are conceptual diagrams illustrating aspects of a method for keypoint detection in an image in accordance with various embodiments.
Figure 5B:
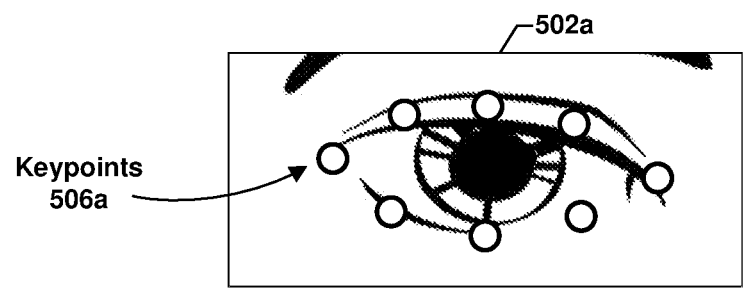
Figure 5B:
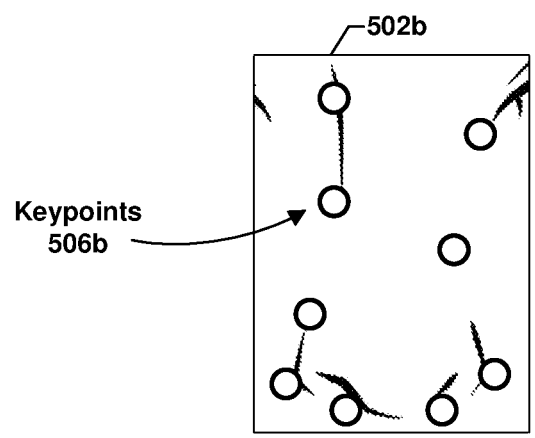
Figure 5B:
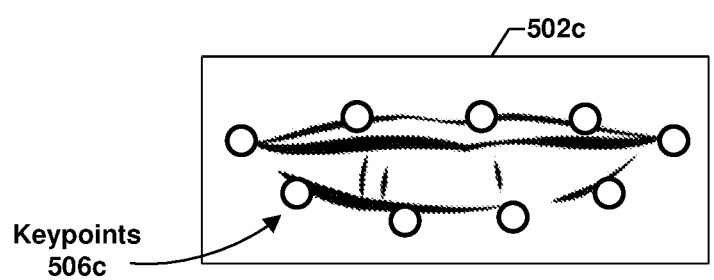

FIGS. 5A and 5B are conceptual diagrams illustrating aspects of a method 500 for keypoint detection in accordance with various embodiments. With reference to FIGS. 1-5B, in various embodiments, a processor (e.g., 202, 204, 310, 312, 314, 316, 318, 352, 360) of a computing device (e.g., 102, 200) may apply a second-stage neural network (e.g., 504a, 504b, 504c) to each of the plurality of regions determined by the first-stage neural network 402 to obtain a plurality of keypoints for each region.

In some embodiments, the processor of the computing device may apply to each of the plurality of regions (e.g., the regions 408a-408h) a second-stage neural network to obtain a plurality of keypoints in each of the plurality regions. In some embodiments, a separate second-stage neural network 504a, 504b, 504c may be applied to each of the plurality of regions. In some embodiments, each second-stage neural network 504a, 504b, 504c may be specifically trained to locate a keypoint or keypoints within a region to which the second-stage neural network is applied. In some embodiments, each second-stage neural network (e.g., 504a, 504b, 504c) may be applied to a cropped image of the face 106, such as a cropped image of an eye region 502a, a cropped image of a nose region 502b, a cropped image of a mouth region 502c, etc. For example, the processor may apply a second-stage neural network 504a that is trained to identify keypoints in eye regions to the eye region of image 502a, a second-stage neural network 504b that is trained to identify keypoints in nose regions to the nose region 502b of the image, a second-stage neural network 504c that is trained to identify keypoints in mouth regions to the mouth region 502c of the image, and so forth. In some embodiments, each of the second-stage neural networks 504a, 504b, 504c may provide as output a plurality of keypoints 506a-506c in each region 502a-502c. In some embodiments, each of the second-stage neural networks 504a, 504b, 504c may be trained such that each of the output keypoints may have a location or coordinate value. For example, the second-stage neural network 504a may provide as output keypoints expressed as x, y coordinates, for example, $(x_1^{R1}, y_1^{R1})$, in which $x_1$ and $y_1$ represent first x and y coordinates, respectively, and R1 represents a first region (e.g., the region 502a) up to K number of keypoints for region 1 (e.g., K1).

In some embodiments, the determined keypoints for each region may include errors or inaccuracies. To improve the performance of each second-stage neural network 504a-504c, each second-stage neural network 504a-504c may output a regional loss value. The regional loss value may be used to update weights of the neural network for that region (e.g., in a backward propagation process). For example, a regional loss ($L_R$) for each determined keypoint (i) may be represented as:

$$L_{R_i} = \frac{1}{K_i}\sum_{j=1}^{K_i} \left| P_j^{R_i} - P_j^{\hat{R}_i} \right|^\gamma \qquad \text{Equation 1}$$

in which $P_j^{R_i}=(x_1, y_1)$ and represents a ground truth, $P_j^{\hat{R}_i}=(x_j^{\hat{R}_i}, y_j^{\hat{R}_i})$ and represents an estimated keypoint, $P_j^{R_i}-P_j^{\hat{R}_i}$ represents a difference between the ground truth and an estimated keypoint, $K_i$ represents a number of landmarks, j represents a particular landmark (e.g., 1, 2, . . . . $K_i$), and $\gamma$ represents a norm or distance operation (e.g., to determine a Euclidean distance). In some embodiments, the norm $\gamma$ can be 1 or 2. In some embodiments, the regional loss value may be determined as a piecewise combination of different norms. In some embodiments, an instance of the second-stage neural network may be trained for a specific region $R_i$ in such a way that the loss $L_{R_j}$ is minimized, e.g., using a standard forward and backward propagation approach, such that the second-stage neural network may be end-to-end trainable.

In some embodiments, each of the second-stage neural networks may be trained to output local features 508a-508c for each of the plurality of regions 502a-502c. In some embodiments, each of the second-stage neural networks may be trained such that the local features 508a-508c of each region 502a-502c may include M dimensions or features of the respective region. In some embodiments, each of the second-stage neural networks may be trained such that the local features may be expressed as $f_1^{R1}, f_2^{R1} \ldots f_M^{gR1}$ in which f represents a value of a feature. In some embodiments, the value of M can be different for different regions. For example, in some embodiments, the length of the features may vary among different regions, which may be expressed as $M_{Ri}$. In various embodiments, the local features are not human-defined features, but rather are an output determined by the second-stage neural network.

Figure 6:
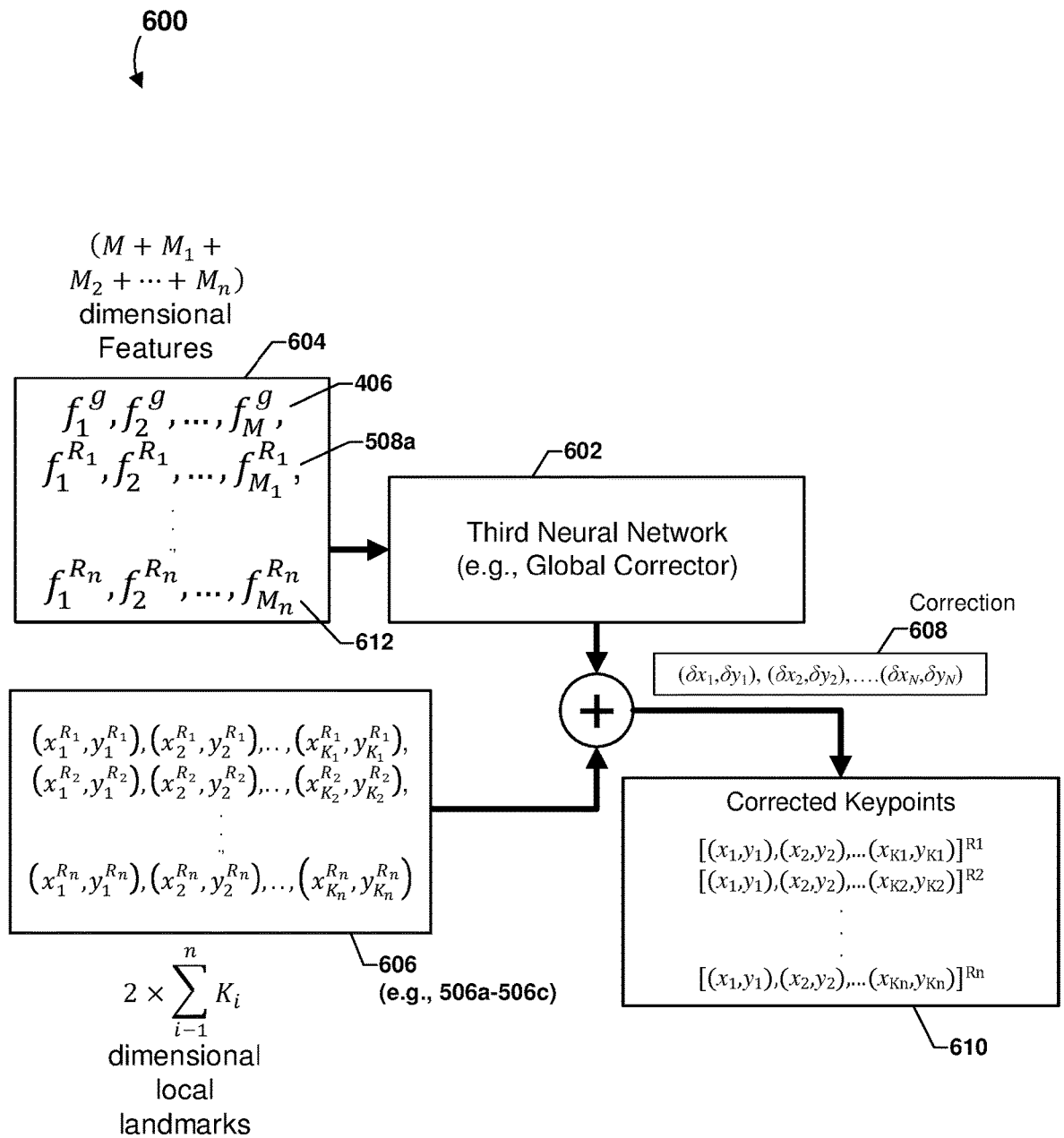
FIG. 6 is a conceptual diagram illustrating aspects of a method for keypoint detection in an image in accordance with various embodiments

FIG. 6 is a conceptual diagram illustrating aspects of a method 600 for keypoint detection in accordance with various embodiments. With reference to FIGS. 1-6, in various embodiments, a processor (e.g., 202, 204, 310, 312, 314, 316, 318, 352, 360) of a computing device (e.g., 102, 200) may apply to the plurality of keypoints (e.g., the keypoints 506a-506c) a third-stage neural network 602 that has been trained to determine a correction 608 for each of the plurality of keypoints to output corrected keypoints 610 (e.g., for each region Rn) suitable for the execution of an image processing function. In some embodiments, the third-stage neural network 602 may function as a global corrector to determine the correction 608 for each of the plurality of keypoints.

In some embodiments, the third-stage neural network 602 may be trained to function as a global corrector to determine the correction 608 for each of the plurality of keypoints 506a-506c. In some embodiments, the third-stage neural network 602 may use one or more features 604 of the image to determine the correction 608 for each of the plurality of keypoints. In some embodiments, the third-stage neural network 602 may be trained to use a multi-dimensional global feature for the image (e.g., the multi-dimensional global feature 406 for the image determined by the first-stage neural network 402) to determine the correction 608 for each of the plurality of keypoints. Additionally or alternatively, in some embodiments, the third-stage neural network 602 may be trained to use a multi-dimensional local feature for each of the plurality of regions (e.g., the multi-dimensional local features 508a-508c determined by each second-stage neural network for each respective region R) to determine the correction 608 for each of the plurality of keypoints. In some embodiments, the corrections 608 may be expressed as delta or change values for each coordinate, such as $\delta x_1, \delta y_1, \delta x_2, \delta y_2, \ldots, \delta x_N, \delta y_N$ up to N coordinates. In some embodiments, the corrections 608 determined by the third-stage neural network 602 may correct for distortions or inaccuracies that arise when the plurality of keypoints 606 obtained by each of the second-stage neural networks are processed collectively, assembled, or combined for processing by application of the third-stage neural network 602. In some embodiments, the one or more features 604 may each be of different lengths (M) for each of (i) number of regions (R), which may be expressed as $M_{Ri}$.

In some embodiments, the third-stage neural network 602 may output a global loss value. In some embodiments, the global loss value may be back-propagated (e.g., in a backward propagation process) to one or more of the first-stage neural network 402, one or more of the second-stage neural network 504a-504c (e.g., the regional neural networks), and/or the third-stage neural network 602. In some embodiments, back-propagating the global loss value may include using the global loss value to update one or more weights of the first-stage neural network 403, one or more weights of the second-stage neural network 504a-504c (e.g., the regional neural networks), and/or one or more weights of the third-stage neural network 602. For example, a global loss ($L_G$) may be represented as:

$$L_G = \Sigma_{j=1}^N |P_j - \hat{P}_j - \hat{\delta}_J|^\gamma \qquad \text{Equation 2}$$

in which $P_j=(x_j, y_j)$ represents a ground truth, $\hat{P}_J=(\hat{x}_J, \hat{y}_J)$ represents a local estimate, $P_j-\hat{P}_J$ represents a difference between the ground truth and the local estimate, $\hat{\delta}_J$ represents a global corrector estimate for a j-th landmark, j represents a particular landmark (e.g., 1, 2, . . . j), and $\gamma$ represents a norm or distance operations (e.g., to determine a Euclidean distance). In some embodiments, the norm $\gamma$ can be 1 or 2.

In various embodiments, the processor may use the corrected keypoints 610 to execute an image processing function.

Figure 7:
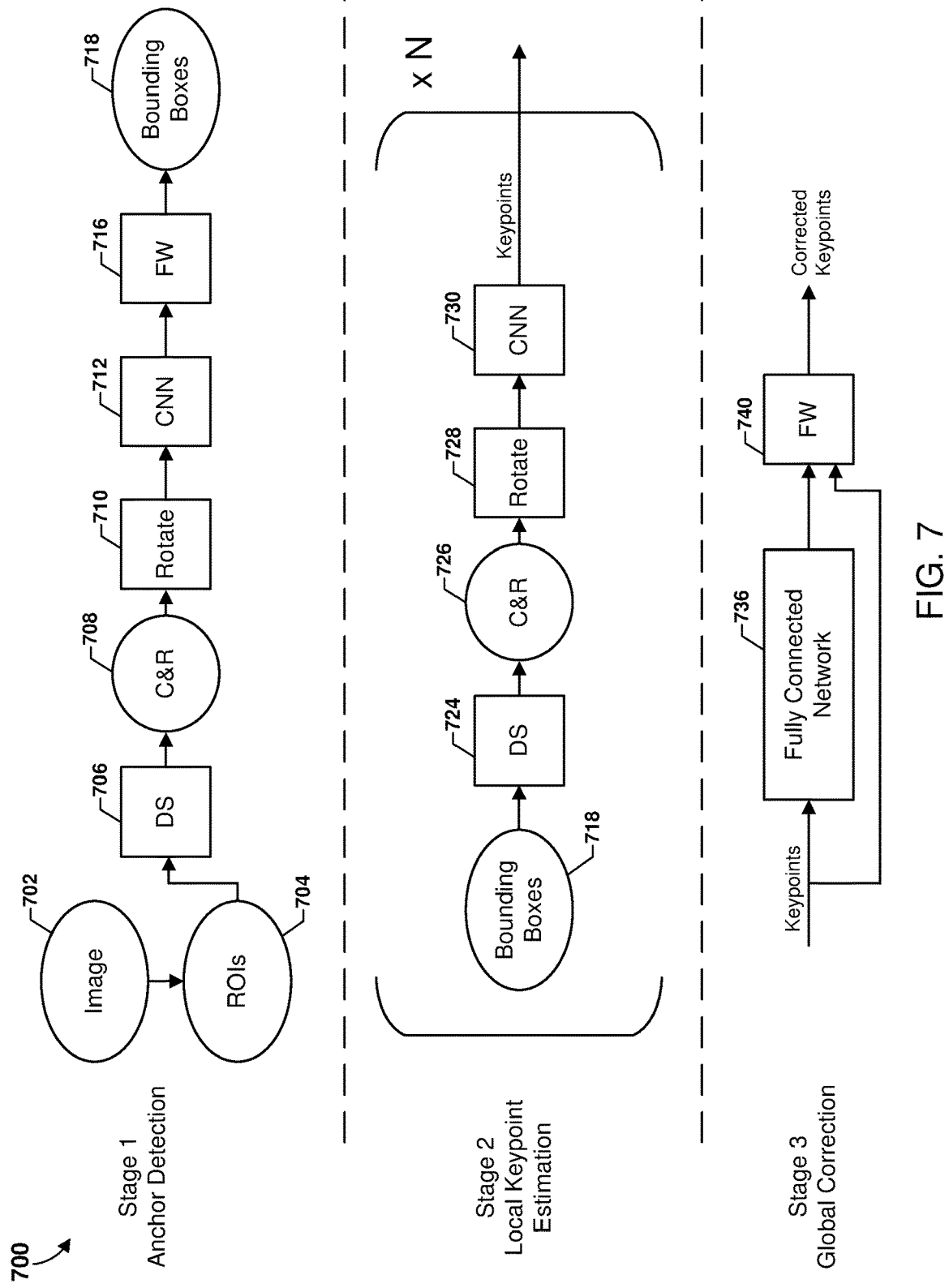
FIG. 7 is a conceptual diagram illustrating an example pipeline suitable for implementing any of the various embodiments.

FIG. 7 is a conceptual diagram illustrating an example pipeline 700 suitable for implementing any of the various embodiments. With reference to FIGS. 1-7, in various embodiments, a processor a processor (e.g., 202, 204, 310, 312, 314, 316, 318, 352, 360) of a computing device (e.g., 102, 200) may execute the operations of the pipeline 700 as further described below. In some embodiments, the pipeline 700 may include a first stage (Stage 1) to define and output a plurality of regions of an image, a second stage (Stage 2) for determination or estimation of a plurality of keypoints local to each of the plurality of regions, and a third stage (Stage 3) for determination of corrections for the keypoints.

The first stage may receive an image 702 and may generate or segment images of regions of interest (ROIs) 704 from the image 702 (for example, output(s) from a face detection process). The image 702 may include a full or complete image (e.g., the image 106) and may include other objects, a background, etc. In some embodiments, the ROIs 704 may include outputs from a module configured to detect a portion of a human body (e.g., a face, hand joint, etc.) within the image 702, distinguished from other objects, the background, etc. that may be present in the image 702.

In some embodiments, operations 706, 708, and 710 may function to standardize a captured image or images. A down-sampler (DS) operation 706 may receive the ROIs 704, may down-sample the image 702 and the ROIs 704, and may provide as output a down-sampled image and down-sampled ROIs to a crop and resizing (C&R) operation 708. The crop and resizing operation 708 may perform image cropping and/or resizing operations to provide as output cropped and/or resized images (for example, at a specified size or of specified dimensions, e.g., 62 pixels×62 pixels). In some embodiments, the operation 708 may convert one or more images to greyscale to reduce an amount of image data to be processed. A rotation operation 710 may rotate the image(s). For example, body portions such as faces may not be centered in an image, may be rotated at an angle, and the like.

The output of the rotation operation 710 may be provided to a convolutional neural network 712. In some embodiments, the convolutional neural network 712 may identify, detect, or determine one or more anchor points for each of the plurality of regions (e.g., ROIs 704). In some embodiments, the convolutional neural network 712 may determine an M-dimensional (i.e., a multidimensional) feature within the ROIs 704. The one or more anchor points may be subject to a firmware processing operation 716. In some embodiments, the output of the firmware processing operation 716 may include bounding boxes 718.

The second stage may be performed N number of times for each identified region of the image (e.g., the regions 408a-408h, 502a-502c). In some embodiments, the second stage may be performed for each of a plurality of bounding boxes (e.g., the bounding boxes 718). Each second stage may receive the bounding boxes 718 for a region N. A down-sampler (DS) operation 724 may receive the bounding boxes 718 and may provide a down-sampled image output to a crop and resizing (C&R) operation 726. The crop and resizing operation 726 may perform image cropping and resizing operations similar to the C&R operation 708. A rotation operation 728 may rotate the image. The output of the rotation operation 728 may be provided to a convolutional neural network 730. In some embodiments, the convolutional neural network 730 may identify, detect, or determine one or more keypoints, such as face landmarks, within the region N. In some embodiments, the convolutional neural network 730 may determine an M-dimensional feature within the region N. In some embodiments, the one or more keypoints and/or the M-dimensional feature output by the convolutional neural network 730 may be stored in a memory (e.g., 206, 216, 320, 358).

The third stage may obtain the one or more keypoints, the global feature, and/or the local features (e.g., from memory 206, 216, 320, 358) and provide the keypoints, the global feature, and/or the local features to a fully connected network 736. In some embodiments, the third stage may generate or determine a concatenated feature vector based on the keypoints and provide the concatenated feature vector to the fully connected network 736. In some embodiments, the fully connected network 736 may function as a global corrector network and may determine corrections to the one or more keypoints. In some embodiments, the corrections may be stored in memory (e.g., 206, 216, 320, 358). The corrections may be applied in a firmware processing operation 740 (such as a summing operation) to provide as output corrected keypoints. In some embodiments, the corrected keypoints may be stored in memory (e.g., 206, 216, 320, 358). In some embodiments the firmware processing operation 740 may add deltas produced by the global corrector to the local keypoint values to determine the corrected keypoints.

Figure 8:
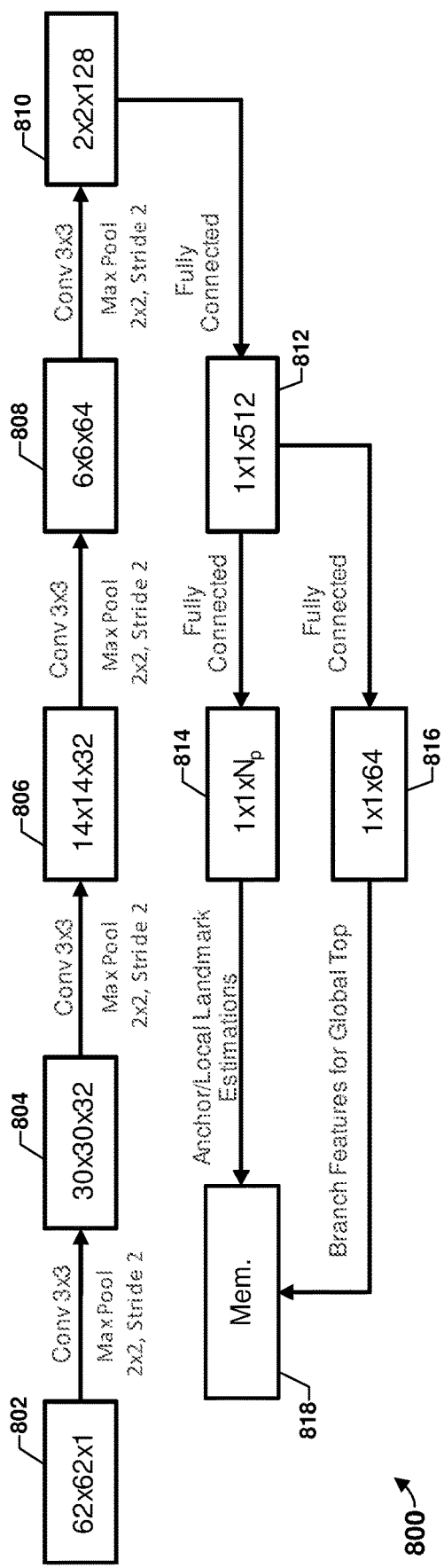
FIGS. 8 and 9 are conceptual diagrams illustrating example implementations of neural networks for implementing any of the various embodiments.
Figure 9:
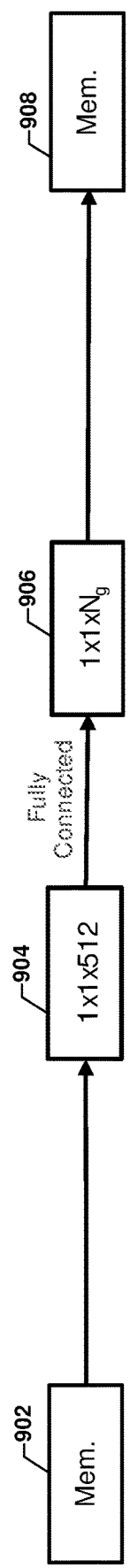

FIGS. 8 and 9 are conceptual diagrams illustrating example implementations of neural networks 800 and 900 for implementing any of the various embodiments. With reference to FIGS. 1-9, in various embodiments, the neural networks 800 and 900 represent examples of neural networks that may be executed on a processor (e.g., 202, 204, 310, 312, 314, 316, 318, 352, 360) of a computing device (e.g., 102, 200). In some embodiments, the neural networks 800 and 900 may be used for face landmark detection and/or for keypoint detection in various embodiments.

FIG. 8 illustrates a neural network architecture that may be used for both the first stage (FIG. 4A) and the second-stage neural network architectures for all regions (FIG. 5A) for the example implementation. Even though the architectures are same, the weights and biases of each of those neural networks are different. Various embodiments break down the problem of detecting keypoints into a few similar but smaller tasks, and thereby make fixed hardware implementation easier to implement. FIG. 9 illustrates an example implementation of the third neural network (FIG. 6). In the example implementation, the whole neural network architecture includes basic operations like 3×3 convolution with strides 1 or 2, 2×2 MaxPooling, PRELU activation and fully connected layers. The implementation illustrated in FIG. 9 shows how breaking down the complex problem into smaller building blocks enables a reliable keypoint estimation performance to be achieved in some embodiments by using basic convolutional neural network operations.

With reference to FIG. 8, the neural network 800 may function to detect region(s) and local landmarks. The neural network 800 may include layers 802-816 that perform various operations including computing an output of a layer, applying an activation function, and/or performing a down-sampling or pooling operation. Outputs from the layer 814 may include determined or estimated anchor points and/or a local landmark for regions of an image, as described. Outputs from the layer 816 may include one or more features for an image and/or region. In some embodiments, the outputs from the layer 816 may include global features or local features. The outputs from the layers 814 and 816 may be stored in a memory 818 (e.g., 206, 216, 320, 358).

With reference to FIG. 9, the neural network 900 may include layers 904 and 906. Values such as global and local features of an image (e.g., the outputs from the layers 814 and/or 816 (FIG. 8)) may be obtained from a memory 902 (e.g., 206, 216, 320, 358) and provided to fully connected layers 904. In some embodiments, the global and local features may be concatenated and provided to the fully connected layers 904. For example, the concatenated features may have a total dimension of 64×(N+1) for N regions, where the (+1) may represent the global feature. Outputs of the fully connected layers 904 may be provided to layer 906, and the outputs of the layer 906 may be stored in a memory 908 (e.g., 206, 216, 320, 358).

Figure 10:
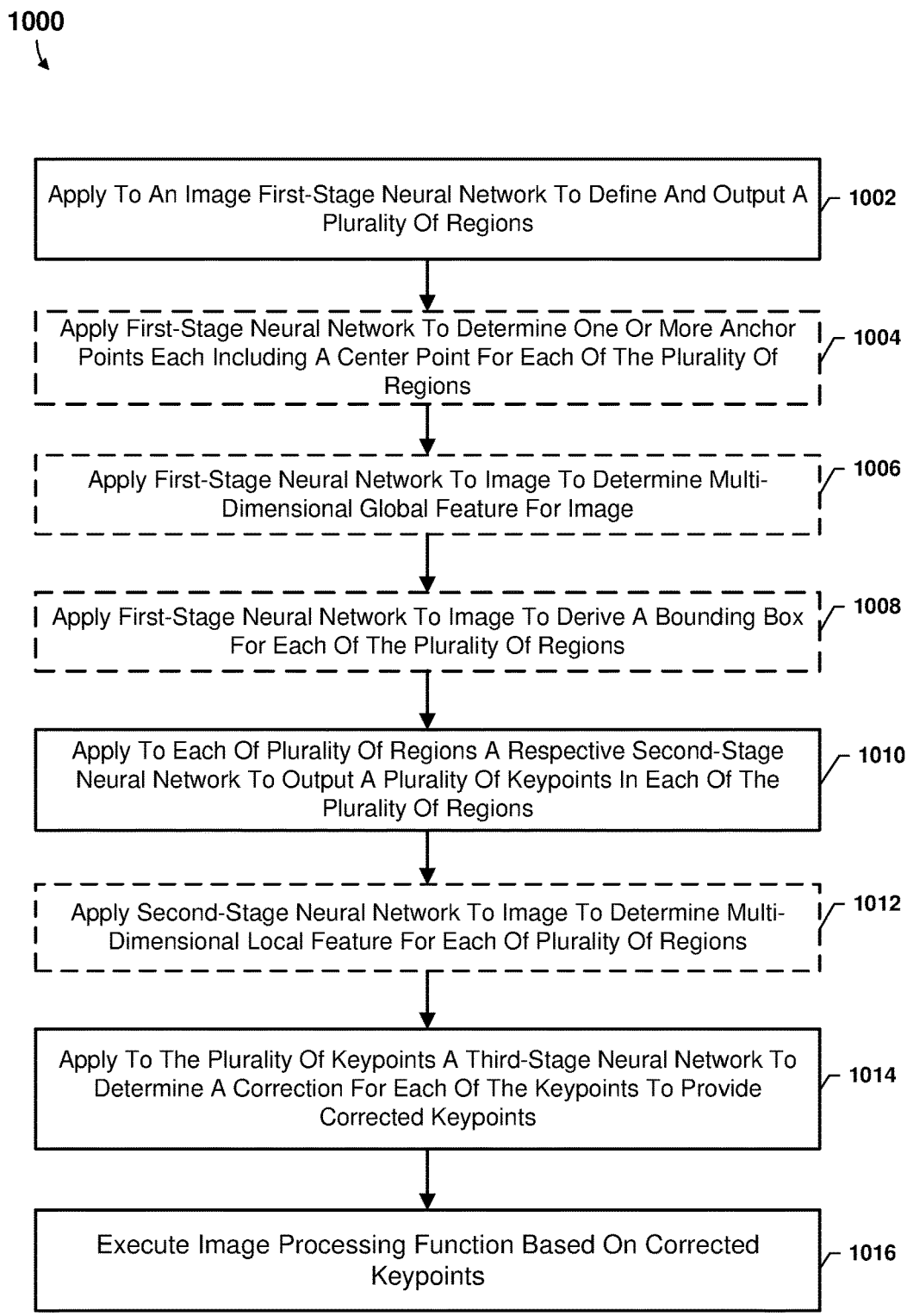
FIG. 10 is a process flow diagram illustrating a method of keypoint detection in an image according to some embodiments.

FIG. 10 is a process flow diagram illustrating a method 1000 of keypoint detection in an image according to some embodiments. With reference to FIGS. 1-10, the method 1000 may be implemented by a processor (e.g., 202, 204, 310, 312, 314, 316, 318, 352, 360) of a computing device (e.g., 102, 200).

In block 1002, the processor may apply a first-stage neural network to an image to define and output a plurality of regions. For example, the first-stage neural network may be trained to segment the image of the portion of the human body into a plurality of regions, such as the regions 408a-408h. In some embodiments, the first-stage neural network may identify in the image an image of portion of a human body. For example, the processor may identify a face, a joint, a limb, or another body portion in the image. In some embodiments, the first-stage neural network may segment the image of the portion of the human body into a plurality of regions.

In optional block 1004, the processor may apply the first-stage neural network to determine one or more anchor points for each of the plurality of regions. For example, the first-stage neural network may be trained to determine one or more of the anchor points 404 for each of the regions to be determined (e.g., the regions 408a-408h). In some embodiments, the one or more anchor points may each include or function as a center point for each of the plurality of regions.

In optional block 1006, the processor may apply the first-stage neural network to the image to determine a multi-dimensional global feature for the image. For example, the processor may apply the first-stage neural network 402 to the image to determine the multi-dimensional global feature 406.

In optional block 1008, the processor may apply the first-stage neural network to the image to derive a bounding box for each of the plurality of regions. For example, the processor may apply the first-stage neural network 402 to the image to determine the bounding box 422. In some embodiments, the processor may apply the first-stage neural network to define for each of the plurality of regions a smallest bounding box that includes the keypoints to be determined from each region.

In block 1010, the processor may apply to each of the plurality of regions a respective second-stage neural network to output a plurality of keypoints in each of the plurality of regions. For example, each of the second-stage neural networks may be trained to identify and output a plurality of keypoints 506a-506c.

In optional block 1012, the processor may apply the second-stage neural network to the image to determine a multi-dimensional local feature for each of the plurality of regions. For example, the processor may apply to each of the plurality of regions (e.g., the regions 408a-408h and the regions 502a-502c) a respective second-stage neural network that has been trained to output local features (e.g., the local features 508a-508c) for each of the plurality of regions (e.g., 502a-502c).

In block 1014, the processor may apply a third-stage neural network 602 to the plurality of keypoints to determine a correction for each of the plurality of keypoints to provide corrected keypoints suitable for the execution of an image processing function. For example, the third-stage neural network 602 may be trained to function as a global corrector to determine the correction 608 for each of the plurality of keypoints 506a-506c. In some embodiments, the third-stage neural network 602 may be applied to a multi-dimensional global feature for the image (e.g., the multi-dimensional global feature 406 for the image determined by the first-stage neural network 402) to determine the correction 608 for each of the plurality of keypoints. Additionally or alternatively, in some embodiments, the third-stage neural network 602 may be applied to a multi-dimensional local feature for each of the plurality of regions (e.g., the multi-dimensional local features 508a-508c determined by each second-stage neural network for each respective region R) to determine the correction 608 for each of the plurality of keypoints.

In some embodiments, the processor may apply the third-stage neural network (e.g., 602) to the plurality of keypoints to determine the correction for each of the plurality of keypoints based on one or more of a multi-dimensional global feature for the image and a multi-dimensional local feature for each of the plurality of regions. For example, the processor may apply to a multi-dimensional global feature for the image (e.g., the multi-dimensional global feature 406 for the image determined by the first-stage neural network 402) the third-stage neural network 602 that has been trained to determine the correction for each of the plurality of keypoints. Additionally or alternatively, the processor may apply the third-stage neural network 602 to a multi-dimensional local feature for each of the plurality of regions (e.g., the multi-dimensional local features 508a-508c determined by each second-stage neural network for each respective region R) to determine the correction for each of the plurality of keypoints.

In block 1016, the processor may execute the image processing function based on the corrected keypoints. In various embodiments, the image processing function may include, for example, facial recognition, face-based authentication, hand joint detection, body joint detection, photo enhancement, photo filters (e.g., adding a hat, mustache, etc. to an image of a face), or another suitable image processing function.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process may be stored in memory so the process may seamlessly resume its operations when it returns to execution on the processor. This operation state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the example methods; the example methods discussed in the following paragraphs implemented by a computing device including means for performing functions of the example methods of the; and the example methods discussed in the following paragraphs implemented as a non-transitory processor-readable storage medium having stored thereon processor-executable instructions configured to cause a processor of a computing device to perform the operations of the example methods.

Example 1. A method performed by a processor of a computing device for keypoint detection in an image, comprising: analyzing an image using a first-stage neural network to define and output a plurality of regions; analyzing each of the plurality of regions using a respective second-stage neural network to output a plurality of keypoints in each of the plurality of regions; and analyzing the plurality of keypoints using a third-stage neural network to determine a correction for each of the plurality of keypoints to provide corrected keypoints.

Example 2. The method of example 1, further comprising executing the image processing function based on the corrected keypoints.

Example 3. The method of any of examples 1-2, wherein analyzing an image using a first-stage neural network to define a plurality of regions comprises: analyzing the image using the first-stage neural network to determine one or more anchor points each comprising a center point for each of the plurality of regions.

Example 4. The method of any of examples 1-3, wherein analyzing an image using a first-stage neural network to define a plurality of regions comprises: analyzing the image using the first-stage neural network to determine a multi-dimensional global feature for the image.

Example 5. The method of any of examples 1-4, wherein analyzing an image using a first-stage neural network to define a plurality of regions comprises: analyzing the image using the first-stage neural network to derive a bounding box for each of the plurality of regions.

Example 6. The method of any of examples 1-5, wherein analyzing an image using a first-stage neural network that has been trained to define and output a plurality of regions comprises: applying the first-stage neural network to define for each of the plurality of regions a smallest bounding box that includes keypoints to be determined from each region.

Example 7. The method of any of examples 1-6, further comprising: identifying in the image an image of a portion of a human body; and segmenting the image of the portion of the human body into the plurality of regions.

Example 8. The method of any of examples 1-7, wherein analyzing each of the plurality of regions using a respective second-stage neural network to output a plurality of keypoints in each of the plurality of regions comprises: applying the second-stage neural network to the image to determine a multi-dimensional local feature for each of the plurality of regions.

Example 9. The method of any of examples 1-8, wherein analyzing the plurality of keypoints using a third-stage neural network to determine a correction for each of the plurality of keypoints to provide corrected keypoints function comprises: applying the third-stage neural network to the plurality of keypoints and to one or more of a multi-dimensional global feature for the image and a multi-dimensional local feature for each of the plurality of regions to determine the correction for each of the plurality of keypoints.

Example 10. The method of any of examples 1-9, wherein each second-stage neural network has been trained to output keypoints for its respective region.

Example 11. The method of any of examples 1-10, wherein analyzing each of the plurality of regions using a respective second-stage neural network that has been trained to output a plurality of keypoints in each of the plurality of regions is performed in parallel.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method performed by a processor of a computing device for keypoint detection in an image, comprising:
    analyzing an image using a first-stage neural network to output a plurality of regions;
    analyzing each of the plurality of regions using a respective second-stage neural network to output a plurality of keypoints in each of the plurality of regions; and
    analyzing the plurality of keypoints using a third-stage neural network to determine a correction for the plurality of keypoints to provide corrected keypoints.

2. The method of claim 1, further comprising executing an image processing function based on the corrected keypoints.

3. The method of claim 1, wherein analyzing an image using a first-stage neural network to output a plurality of regions comprises:
    analyzing the image using the first-stage neural network to determine one or more anchor points each comprising a center point for each of the plurality of regions.

4. The method of claim 1, wherein analyzing an image using a first-stage neural network to output a plurality of regions comprises:
    analyzing the image using the first-stage neural network to determine a multi-dimensional global feature for the image.

5. The method of claim 1, wherein analyzing an image using a first-stage neural network to output a plurality of regions comprises:
    analyzing the image using the first-stage neural network to derive a bounding box for each of the plurality of regions.

6. The method of claim 1, wherein analyzing an image using a first-stage neural network to output a plurality of regions comprises:
    applying the first-stage neural network to define for each of the plurality of regions a smallest bounding box that includes keypoints to be determined from each region.

7. The method of claim 1, further comprising:
    identifying in the image a portion of a human body; and
    segmenting the portion of the human body into the plurality of regions.

8. The method of claim 1, wherein analyzing each of the plurality of regions using a respective second-stage neural network to output a plurality of keypoints in each of the plurality of regions comprises:
    applying the second-stage neural network to the image to determine a multi-dimensional local feature for each of the plurality of regions.

9. The method of claim 1, wherein analyzing the plurality of keypoints using a third-stage neural network to determine a correction for the plurality of keypoints to provide corrected keypoints comprises:
    applying the third-stage neural network to the plurality of keypoints and to one or more of a multi-dimensional global feature for the image and a multi-dimensional local feature for each of the plurality of regions to determine the correction for the plurality of keypoints.

10. The method of claim 1, wherein each second-stage neural network has been trained to output keypoints for its respective region.

11. The method of claim 1, wherein analyzing each of the plurality of regions using a respective second-stage neural network to output a plurality of keypoints in each of the plurality of regions is performed in parallel.

12. A computing device, comprising:
    a memory; and
    a processor coupled to the memory and configured with processor-executable instructions to perform operations comprising:
        analyzing an image using a first-stage neural network to output a plurality of regions;
        analyzing each of the plurality of regions using a respective second-stage neural network to output a plurality of keypoints in each of the plurality of regions; and
        analyzing the plurality of keypoints using a third-stage neural network to determine a correction for the plurality of keypoints to provide corrected keypoints.

13. The computing device of claim 12, wherein the processor is configured with processor-executable instructions to perform operations further comprising executing an image processing function based on the corrected keypoints.

14. The computing device of claim 12, wherein the processor is configured with processor-executable instructions to perform operations such that analyzing an image using a first-stage neural network to output a plurality of regions comprises:
    analyzing the image using the first-stage neural network to determine one or more anchor points each comprising a center point for each of the plurality of regions.

15. The computing device of claim 12, wherein the processor is configured with processor-executable instructions to perform operations such that analyzing an image using a first-stage neural network to output a plurality of regions comprises:
    analyzing the image using the first-stage neural network to determine a multi-dimensional global feature for the image.

16. The computing device of claim 12, wherein the processor is configured with processor-executable instructions to perform operations such that analyzing an image using a first-stage neural network to output a plurality of regions comprises:
analyzing the image using the first-stage neural network to derive a bounding box for each of the plurality of regions.

17. The computing device of claim 12, wherein the processor is configured with processor-executable instructions to perform operations such that analyzing an image using a first-stage neural network to output a plurality of regions comprises:
applying the first-stage neural network to define for each of the plurality of regions a smallest bounding box that includes keypoints to be determined from each region.

18. The computing device of claim 12, wherein the processor is configured with processor-executable instructions to perform operations further comprising:
identifying in the image a portion of a human body; and
segmenting the portion of the human body into the plurality of regions.

19. The computing device of claim 12, wherein the processor is configured with processor-executable instructions to perform operations such that analyzing each of the plurality of regions using a respective second-stage neural network to output a plurality of keypoints in each of the plurality of regions comprises:
applying the second-stage neural network to the image to determine a multi-dimensional local feature for each of the plurality of regions.

20. The computing device of claim 12, wherein the processor configured with processor-executable instructions to perform operations such that analyzing the plurality of keypoints using a third-stage neural network to determine a correction for the plurality of keypoints to provide corrected keypoints comprises:
applying the third-stage neural network to the plurality of keypoints and to one or more of a multi-dimensional global feature for the image and a multi-dimensional local feature for each of the plurality of regions to determine the correction for the plurality of keypoints.

21. The computing device of claim 12, wherein the processor configured with processor-executable instructions to perform operations such that analyzing each of the plurality of regions using a respective second-stage neural network to output a plurality of keypoints in each of the plurality of regions is performed in parallel.

22. A non-transitory processor-readable medium having stored thereon processor-executable instructions configured to cause a processor of a computing device to perform operations comprising:
analyzing an image using a first-stage neural network to output a plurality of regions;
analyzing each of the plurality of regions using a respective second-stage neural network to output a plurality of keypoints in each of the plurality of regions; and
analyzing the plurality of keypoints using a third-stage neural network to determine a correction for the plurality of keypoints to provide corrected keypoints.

23. The non-transitory processor-readable medium of claim 22, further comprising executing an image processing function based on the corrected keypoints.

24. The non-transitory processor-readable medium of claim 22, wherein analyzing an image using a first-stage neural network to output a plurality of regions comprises:
analyzing the image using the first-stage neural network to determine one or more anchor points each comprising a center point for each of the plurality of regions.

25. The non-transitory processor-readable medium of claim 22, wherein analyzing an image using a first-stage neural network to output a plurality of regions comprises:
analyzing the image using the first-stage neural network to determine a multi-dimensional global feature for the image.

26. The non-transitory processor-readable medium of claim 22, wherein analyzing an image using a first-stage neural network to output a plurality of regions comprises:
analyzing the image using the first-stage neural network to derive a bounding box for each of the plurality of regions.

27. The non-transitory processor-readable medium of claim 22, wherein analyzing an image using a first-stage neural network to output a plurality of regions comprises:
applying the first-stage neural network to define for each of the plurality of regions a smallest bounding box that includes keypoints to be determined from each region.

28. The non-transitory processor-readable medium of claim 22, wherein analyzing each of the plurality of regions using a respective second-stage neural network to output a plurality of keypoints in each of the plurality of regions comprises:
applying the second-stage neural network to the image to determine a multi-dimensional local feature for each of the plurality of regions.

29. The non-transitory processor-readable medium of claim 22, wherein analyzing the plurality of keypoints using a third-stage neural network to determine a correction for the plurality of keypoints to provide corrected keypoints function comprises:
applying the third-stage neural network to the plurality of keypoints and to one or more of a multi-dimensional global feature for the image and a multi-dimensional local feature for each of the plurality of regions to determine the correction for the plurality of keypoints.

30. A computing device, comprising:
means for analyzing an image using a first-stage neural network to output a plurality of regions;
means for analyzing each of the plurality of regions using a respective second-stage neural network to output a plurality of keypoints in each of the plurality of regions; and
means for analyzing the plurality of keypoints using a third-stage neural network to determine a correction for the plurality of keypoints to provide corrected keypoints.

* * * * *